United States Patent [19]

Rutschmann et al.

[11] Patent Number: 4,622,926
[45] Date of Patent: Nov. 18, 1986

[54] AIR INTAKE SYSTEM OF A MULTI-CYLINDER INTERNAL COMBUSTION ENGINE

[75] Inventors: Erwin Rutschmann, Bad Herrenalb; Ludwig Theilemann, Boeblingen, both of Fed. Rep. of Germany

[73] Assignee: Dr. Ing. h.c.F. Porsche Aktiengesellschaft, Fed. Rep. of Germany

[21] Appl. No.: 751,511

[22] Filed: Jul. 3, 1985

[30] Foreign Application Priority Data

Jul. 3, 1984 [DE] Fed. Rep. of Germany ....... 3424433

[51] Int. Cl.$^4$ .............................................. F02B 27/00
[52] U.S. Cl. .......................... 123/52 MB; 123/52 MV
[58] Field of Search ......... 123/52 M, 52 MB, 52 MC, 123/52 MV

[56] References Cited

U.S. PATENT DOCUMENTS

| | | | |
|---|---|---|---|
| 3,441,008 | 4/1969 | Nelson | 123/52 MB |
| 4,510,896 | 4/1985 | Rutschmann | 123/52 MB |
| 4,549,506 | 10/1985 | Rush et al. | 123/52 MB |

FOREIGN PATENT DOCUMENTS

| | | | |
|---|---|---|---|
| 647884 | 7/1937 | Fed. Rep. of Germany | 123/52 M |
| 115818 | 9/1981 | Japan | 123/52 MB |

*Primary Examiner*—Craig R. Feinberg
*Attorney, Agent, or Firm*—Barnes & Thornburg

[57] ABSTRACT

An air intake installation of an internal combustion engine consisting of an I-shaped distributor member which is formed of two resonant chamber and of a connecting pipe connected to the air filter. Two bypass pipes are additionally located between the two resonant chamber in parallel with the connecting pipe, of which one is also connected with the air filter by way of an intake connection. The other bypass pipe and the connecting pipe are adapted to be closed off with respect to the resonant chamber by way of throttle valves located near the ends of the connecting pipe and of the other bypass pipe. By corresponding actuation and adjustment of the throttle valves, the connecting cross sections between the resonant chambers which effect the resonance can be adjusted in three stages and the resonance point can be displaced correspondingly into different rotational speed ranges.

8 Claims, 1 Drawing Figure

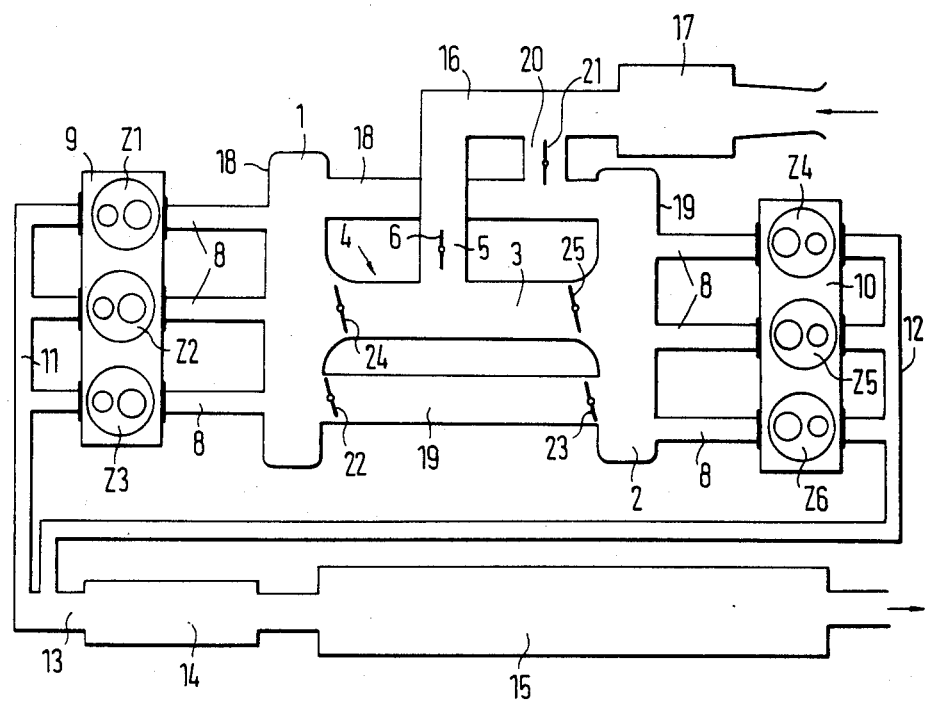

AIR INTAKE SYSTEM OF A MULTI-CYLINDER INTERNAL COMBUSTION ENGINE

The present invention relates to an air intake installation of a multi-cylinder internal combustion engine with a distributor member consisting of two resonant chambers and of a connecting pipe tuned for tuned-intake pressure-charging.

Such a gas-dynamic oscillating system, described in German Application No. P 34 08 899.7 has a certain natural frequency which is determined by the volumes of the resonant chambers as well as by the cross section and the length of the connecting pipe. When this natural frequency approximately coincides with the frequency of the discontinuous, non-steady suction flow of the cylinders, resonance occurs. The gas oscillations generated by the suction action of the cylinders are amplified and bring about a charging effect of the cylinders which leads to a better degree of filling and therewith to an increase of the torque and of the output. It is thereby disadvantageous that such an air intake installation has to be matched in each case to the cylinder volume and to the desired torque curve of the internal combustion engine from which results a large number of constructions of different size.

It is the object of the present invention to render such an air intake system utilizable for different internal combustion engines by a particular construction and to achieve an optimal torque curve over the rotational speed.

The underlying problems are solved according to the present invention in that during the operation of the internal combustion engine the through-flow cross section connecting the resonant chambers and/or the volume of the air intake installation is changeable. If the through-flow cross section from one to the other resonant chamber is increased, then the natural frequency increases; the resonance point and the torque magnification can be displaced into a higher rotational speed range. This increase can be achieved continuously only with very great difficulties because the connecting cross section must be constant over the entire length from the one to the other resonant chamber in order not to influence disadvantageously the oscillation waveform with a center oscillating node point. For that reason, one or more by-pass pipes are placed in parallel with the connecting pipe, whose air through-flow areas are controllable by throttle valves or valve members.

The throttle valves are thereby so arranged that during the opening or closing thereof, in addition to the change of the connecting cross-section effecting resonance, also the overall volume of the air intake installation is changed. This measure also permits to avoid the so-called idling sawing injection-type internal combustion engines which is created by periodic rotational speed fluctuations of the internal combustion engine. The cause therefor is the fact that the air quantity actually sucked-in by the engine at the inlet valve is not identical in the non-steady condition with the air quantity measured by the air quantity measuring device of the injection system. For, by reason of dynamic effects, the pressure change in the suction pipe corresponding to the sucked-in air quantity is converted only with a phase displacement into a change of the volume flow at the air quantity measuring device. The air quantity measuring device therefore cannot supply a signal for the formation of the desired mixture composition which is coordinated correctly from a time point of view. The entire suction and injection system becomes non-steady or unstable and during idling of the internal combustion engine builds up during idling into considerable rotational speed fluctuations whose amplitude is the larger, the larger the ratio of the overall volume of the air intake system to the stroke volume of the cylinders. According to a further feature of the present invention, the volume of the air intake installation is therefore reduced to a minimum amount during idling and in the lower rotational speed range by disconnecting the connecting pipe and one bypass pipe.

These and other objects, features and advantages of the present invention will become more apparent from the following description when taken in connection with the accompanying drawing which shows, for purposes of illustration only, one embodiment in accordance with the present invention, and wherein:

The single FIGURE is a schematic view of an air intake installation in accordance with the present invention.

Referring now to the single FIGURE of the drawing, an I-shaped distributor member generally designated by reference numeral 4 is formed of a resonant chamber or container 1, of a resonant chamber or container 2 and of a connecting pipe 3; an intake connection 5 which is connected perpendicularly to the connecting pipe 3, contains a throttle valve 6. Three suction pipes 8 start from each of the resonant chambers or containers 1 and 2 which are disposed in parallel to the connecting pipe 3 and which narrow conically in the direction from the resonant chambers to the inlet channels of the two cylinder groups 9 and 10 consisting of three cylinders each. One cylinder group 9 includes the cylinders Z1, Z2 and Z3 and the other cylinder group 10 includes the cylinders Z4, Z5 and Z6.

The exhaust gases of the two cylinder groups 9 and 10 are conducted by way of exhaust gas manifolds 11 and 12 to an exhaust gas line 13 and reach the atmosphere after flowing through a front muffler 14 and a main muffler 15. The intake connection 5 is connected by way of a suction line 16 with an air filter 17, through which the air is sucked-in out of the atmosphere.

A bypass pipe 18 and a bypass pipe 19 are connected in parallel with the connecting pipe 3 between the resonance chambers or containers 1 and 2. The one bypass pipe 18 is connected to the air filter 17 by way of an intake connection 20 which contains a throttle valve 21. The throttle valves 22 and 23, respectively, 24 and 25 are arranged in the other bypass pipe 19 and in the connecting pipe 3 at the discharge places thereof to the resonance chambers or containers 1 and 2. The air supply is controlled by way of the throttle valves of the intake connections which are actuated by means of a register control.

During idling and in the lower rotational speed range of the internal combustion engine up to a rotational speed of about 3,500/min., the throttle valves 22 and 23 as well as 24 and 25 are closed. Consequently, air is sucked-in only by way of the bypass pipe 18 whereby the cylinders Z1, Z6, Z2, Z4, Z5, Z3 suck in air successively out of the resonance chambers corresponding to their ignition sequence by way of the suction pipe coordinated to the same. An approximately diagonal through-flow of the distributor member 4 results therefrom which is continued in the respective suction pipes. Beginning with a rotational speed of about 3,500/min., the connecting pipe 3 is additionally interconnected into the system by opening of the throttle valve 6 in the intake connection 5 and of the throttle valves 24 and 25. The throttle valves 22 and 23 of the second bypass pipe 19 are opened only at full load, beginning with a rotational speed of about 5,700/min.

At least one of the two bypass lines 18 and 19 is preferably smaller in cross section than the connecting pipe 3. However, both connecting pipes 18 and 19 may have also a smaller cross section than the connecting pipe 3 with the cross sections of the connecting pipes 18 and 19 differing from one another. Additionally, in a preferred embodiment, each of the two resonant chambers or containers 1 and 2 has approximately the same volume as the volume of the connecting pipe 3 plus the volume of the smaller bypass pipe 18 inclusive their intake connections 5 and 20.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An air intake installation of a multi-cylinder internal combustion engine, comprising a substantially I-shaped distributor means matched for tuned-intake pressure-charging which includes two resonance chamber means and a connecting pipe means interconnecting the two resonance chamber means, individual suction pipes leading from the resonance chamber means to the cylinders of the engine, an intake connection terminating approximately perpendicularly in the connecting pipe means and controllable by a throttle valve means, means during operation of the internal combustion engine for changing at least one of through-flow cross section and volume of the air intake installation connecting the resonance chamber means, at least one bypass pipe means operatively connecting the resonance chamber means being located substantially in parallel to the connecting pipe means, throttle valve means for controlling the air flow through the bypass pipe means, said one bypass pipe means including an intake connecting means controllable by a throttle valve means, by way of which air enters in parallel to the intake connection means of the connecting pipe means, and wherein a second bypass pipe means is connected between the resonance chamber means, the second bypass pipe means and the connecting pipe means being operable to be closed by throttle valve means.

2. An air intake installation according to claim 1, wherein the throttle valve means are so adjusted and controlled that in a lower rotational speed range of the internal combustion engine air is supplied to the resonance chamber means only by way of the one bypass means, that in a middle rotational speed range of the internal combustion engine the connecting pipe means and in an upper rotational speed range of the internal combustion engine also the second bypass pipe means is additionally interconnected by opening of the associated throttle valve means whereby the cross section and the overall volume of the air intake installation which effects the resonance, is changed.

3. An air intake installation according to claim 1, wherein the throttle valve means in the connecting pipe means and in the second bypass pipe means are arranged in an area of respective pipe ends near the connections with the resonance chamber means.

4. An air intake installation according to claim 3, wherein the throttle valve means are so adjusted and controlled that in a lower rotational speed range of the internal combustion engine air is supplied to the resonance chamber means only by way of the one bypass means, that in a middle rotational speed range of the internal combustion engine the connecting pipe means and in an upper rotational speed range of the internal combustion engine also the second bypass pipe means is additionally interconnected by opening of the associated throttle valve means whereby the cross section and the overall volume of the air intake installation which effects the resonance, is changed.

5. An air intake installation according to claim 4, wherein each of the two resonance chamber means has an approximately equal volume as the connecting pipe means and the smaller bypass pipe means including the intake connection means thereof.

6. An air intake installation according to claim 1, wherein at least one of the bypass pipe means is smaller in cross section than the connecting pipe means.

7. An air intake installation according to claim 6, wherein each of the two resonance chamber means has an approximately equal volume as the connecting pipe means and the smaller bypass pipe means including the intake connection means thereof.

8. An air intake installation according to claim 7, wherein the throttle valve means in the connecting pipe means and in the second bypass pipe means are arranged in an area of respective pipe ends near the connections with the resonance chamber means.

* * * * *